United States Patent [19]
Tanaka et al.

[11] Patent Number: 5,949,409
[45] Date of Patent: *Sep. 7, 1999

[54] IMAGE PROCESSING IN WHICH THE IMAGE IS DIVIDED INTO IMAGE AREAS WITH SPECIFIC COLOR LOOKUP TABLES FOR ENHANCED COLOR RESOLUTION

[75] Inventors: Masayoshi Tanaka, Kanagawa; Masakazu Suzuoki; Toyoshi Okada, both of Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/565,555

[22] Filed: Nov. 30, 1995

[30] Foreign Application Priority Data

Dec. 2, 1994 [JP] Japan ................................ P06-300029

[51] Int. Cl.⁶ ................................ G09G 5/04; G09G 5/06
[52] U.S. Cl. ......................... 345/186; 345/199; 345/431
[58] Field of Search ..................................... 345/153, 185, 345/186, 199, 430, 431; 395/130, 131, 129, 507, 515, 800.27; 358/500, 515, 518, 523

[56] References Cited

U.S. PATENT DOCUMENTS

| | | | |
|---|---|---|---|
| 4,580,134 | 4/1986 | Campbell et al. | 345/152 |
| 4,743,959 | 5/1988 | Frederiksen | 348/396 |
| 4,811,124 | 3/1989 | Dujari | 369/59 X |
| 4,823,120 | 4/1989 | Thompson et al. | 345/199 |

(List continued on next page.)

FOREIGN PATENT DOCUMENTS

| | | | |
|---|---|---|---|
| A-0 210 423 | 4/1987 | European Pat. Off. | G09G 1/28 |
| A-0 522 853 | 1/1993 | European Pat. Off. . | |
| A-0 590 881 | 4/1994 | European Pat. Off. . | |
| A-2-195-519 | 7/1988 | United Kingdom | G09G 1/28 |
| A-2-231-245 | 7/1990 | United Kingdom | G06F 15/62 |
| A-2272137 | 4/1994 | United Kingdom . | |
| WO 84/02027 | 5/1984 | WIPO | G09G 1/28 |

OTHER PUBLICATIONS

Computer Technology Review, Special Summer Issue, 11 (1991) Jul., No. 9, Integrating Image Processing With Standard Workstation Platforms by David Pfeiffer, pp. 103, 104, 106 & 107.

IEEE Computer Graphics and Application, 11 (1991) Mar., No. 2, Graphics Workstations: A European Perspective by Ken Robbins, Mark Martin, Max Mehl, Allan Davison, Kieron Drake and Mel Slater, pp. 91–103.

SMPTE Journal, vol. 100, No. 3, Mar. 1991, US, pp. 162–166, XP000178490, Vigneaux, et al.: "A Real–Time Video Mapping and Manipulating System".

Computer Graphics Principles and Practice, 2d, 1990, Addison–Wesley, Foley, et al., pp. 741–744.

Eurographics, 4–8 Sep. 1989, Amsterdam, pp. 257–268, SP000132231, Bennis and Gagalowicz: "Hierarchical Texture Synthesis on 3–D Surfaces".

*Primary Examiner*—Jeffery Brier
*Assistant Examiner*—Paul A. Bell
*Attorney, Agent, or Firm*—Fulwider Patton Lee & Utecht, LLP

[57] ABSTRACT

There are provided a geometry transfer engine (GTE) 61 and a graphic processing unit (GPU 62) which act in combination as a transforming means for converting three-dimensional image data retrieved from a CD-ROM disk into two-dimensional image data for drawing an image on a two-dimensional display screen, and a frame buffer 63 which serves as a memory having an image data storage area (picture data area) for storage of the image data and at least a color data tables storage area (CLUT area) for storage of multiple color lookup data tables in a two-dimensional arrangement, each color data table including a color data wherein the structure is arranged substantially identical to that of each pixel of data in the image. A greater number of colors are thus facilitated and the data processing is simplified.

9 Claims, 10 Drawing Sheets

U.S. PATENT DOCUMENTS

| | | | |
|---|---|---|---|
| 4,935,879 | 6/1990 | Ueda | 345/139 |
| 5,025,249 | 6/1991 | Seiler et al. | 345/152 |
| 5,091,717 | 2/1992 | Carrie et al. | 345/340 |
| 5,128,658 | 7/1992 | Pappas et al. | 345/199 |
| 5,175,806 | 12/1992 | Muskovitz et al. | 345/425 |
| 5,224,208 | 6/1993 | Miller, Jr. et al. | 345/425 |
| 5,285,275 | 2/1994 | Abe | 348/384 |
| 5,291,468 | 3/1994 | Carmon | 369/48 X |
| 5,307,450 | 4/1994 | Grossman | 345/423 |
| 5,313,226 | 5/1994 | Takakura et al. | 345/199 |
| 5,319,793 | 6/1994 | Hancock et al. | 345/431 |
| 5,406,310 | 4/1995 | Aschenbrenner et al. | 345/199 |
| 5,430,465 | 7/1995 | Sabella et al. | 345/199 |
| 5,471,450 | 11/1995 | Yonemitsu | 369/60 |
| 5,475,812 | 12/1995 | Corona et al. | 345/344 |
| 5,491,677 | 2/1996 | Sasaki | 369/60 |
| 5,535,315 | 7/1996 | Itoh | 345/431 |
| 5,537,224 | 7/1996 | Suzuoki et al. | 345/430 |
| 5,553,208 | 9/1996 | Murata et al. | 345/425 |
| 5,561,746 | 10/1996 | Murata et al. | 345/419 |
| 5,629,720 | 5/1997 | Cherry et al. | 345/199 |
| 5,757,376 | 5/1998 | Suzuoki et al. | 345/431 |

4BIT MODE

8BIT MODE

16BIT MODE

24BIT MODE

PIXEL DATA

| 0 | 0 | 1 | 4 | 2 | 0 | 3 | · |
|---|---|---|---|---|---|---|---|
| 0 | 0 | 1 | 4 | 2 | 0 | 3 | · |
|   |   |   |   |   |   |   |   |

FIG.19

(PRIOR ART)

COLOR LUI

| COLOR #0 | COLOR #1 | COLOR #2 | COLOR #3 | |
|---|---|---|---|---|

FIG.20

(PRIOR ART)

IMAGE PROCESSING IN WHICH THE IMAGE IS DIVIDED INTO IMAGE AREAS WITH SPECIFIC COLOR LOOKUP TABLES FOR ENHANCED COLOR RESOLUTION

This application claims priority under the International Convention based upon Japanese Patent Application No. P06-300029 filed Dec. 2, 1994.

BACKGROUND OF THE INVENTION

This invention relates generally to a method and apparatus for producing image data by data processing and, more particularly, to a new and improved image data processing method and apparatus for processing enhanced image data, and a recording medium carrying such enhanced image data.

It is common practice in the prior art that images produced on a television receiver, a monitor or a CRT display of a home video-game machine, a microcomputer, or a graphic computer are substantially two-dimensional. Such images are usually animated by moving and varying a two-dimensional character or object on a planar two-dimensional background. However, such two-dimensional images or pictures are limited in both the modeling of a background and the movement of character objects, thus failing to yield more realistic images, particularly in a video game.

For improvement, various methods of making highly realistic three-dimensional images or pictures have been proposed and some of them are described below. One of various predetermined movements of a character object viewed from several directions may be selected and displayed according to visual variation, such as a change in the viewpoint in the image. Also, a simulated three-dimensional image may be created by overlapping a plurality of two-dimensional graphics, one over the other, in a depthwise direction. A texture mapping method may also be provided in which the surfaces of a polygon are filled with a texture map (of material or pattern) to generate an image model. In another method, a variation of colors is produced by changing color data of the image with the use of a color lookup table.

In a typical example of a prior art home video-game machine, manipulation information is introduced from an input device, such as an entry pad or a joy stick, and is passed across an interface along a main bus by the action of a CPU consisting mainly of a microprocessor. Upon introduction of the manipulation data, three-dimensional data stored in a main memory is transmitted by the action of a video processor to a source video memory for temporary storage.

The aforementioned CPU also operates to transfer to the video processor a specific sequence for reading out a series of image data segments from the source video memory for overlapping them, one over the other, on the screen. According to the reading sequence of the image data segments, the video processor reads the image data segments from the source video memory and displays them in their overlapped arrangement.

While the image data segments are being read and displayed, audio components of the manipulation information are fed to an audio processor which, in turn, picks up corresponding audio data from an audio memory for synchronization with the image data.

For example, the source video memory may hold a background of a checker-board pattern and a group of rectangular image segments or sprites representing cross sections of a cylindrical object in the background. Other areas besides the cross sections of the cylindrical object on the sprites may be drawn in transparency.

A sync generator mounted in the video processor generates a read address signal in response to a sync signal of the image data. The read address signal of the sync generator is transmitted via the main bus to a read address table determined by the CPU. The sync generator also reads the image segments from the source video memory in response to a signal from the read address table.

The video data segments retrieved are then fed to an overlap processor where they are overlapped, one over the other, in the sequence determined by a priority table and passed via the main bus from the CPU. Since the background comes first and is then followed by the rectangle sprites, the group of sprites are placed in superposition, one over the other, on the background.

Then, the other areas in addition to the cross sections of the cylindrical object of the aforementioned sprites, which are overlapped one over the other on the background, are rendered to transparency by a suitable transparency processor. As a result, the two-dimensional image data of the cylindrical object can be reproduced as three-dimensional data VD0 of the original image.

The source video memory is divided into two areas: a pixel data storage area, in which pixel data are aligned in a two-dimensional arrangement expressed by a matrix of small squares, and a color lookup table area, in which color data are aligned in a one-dimensional arrangement denoted by a row of small rectangles.

The color lookup table comprises a one-dimensionally aligned color data table extending in one direction or laterally of the source video memory. The color lookup table thus depends much on the lateral distance of the source video memory and will be limited in the number of colors that can be displayed.

Accordingly, there has been a long existing need for enhanced image data processing offering a greater number of colors, compatible with relatively simple processing, and for a recording medium carrying such enhanced image data. The present invention clearly fulfills these needs.

SUMMARY OF THE INVENTION

Briefly, and in general terms, the present invention provides an improved method of processing image data which offers a greater number of colors and is compatible with relatively simple processing, to a new and improved apparatus for processing such image data, and a recording medium carrying such enhanced image data.

More particularly, by way of example and not necessarily by way of limitation, the present invention provides an image data producing method for providing three-dimensional image data which is converted into two-dimensional image data for drawing an image on a two-dimensional display screen, and having multiple color lookup data tables wherein the structure of the color data in a one-dimensionally aligned color data table includes a plurality of the color data arranged substantially identical to that of each pixel data in the image, and a group of the one-dimensionally aligned color data tables are prepared. Each color lookup table in the group of color tables may be assigned to a specifically designated area of the image to expand the range of colors that would otherwise be provided by a single color lookup table used for the entire image.

Furthermore, an image data processing apparatus in accordance with the present invention, may comprise a transforming drawing means for converting a three-dimensional image data into two-dimensional image data for drawing an image on a two-dimensional display screen, a memory means having an image data storage area for storage of the image data, and at least a color data tables storage area for storing a multiplicity of color data tables in a two-dimensional arrangement, each of the tables including a plurality of one-dimensionally aligned color data wherein the structure is substantially identical and corresponds to that of each data pixel in the image, whereby individual ones of the group of color lookup tables may be assigned to separate image areas for enhanced color.

In addition, a recording medium according to the present invention carries three-dimensional image data which is converted into two-dimensional image data for drawing an image on a two-dimensional display screen wherein a group of color data tables, each table including a plurality of one-dimensionally aligned color data which is substantially identical to that of each data pixel in the image, are stored, whereby individual ones of the group of color lookup tables may be assigned to separate image areas for enhanced color.

In accordance with the present invention, the structure of each color data in each of the one-dimensionally aligned color data tables, is arranged substantially identical to that of each data pixel in the image, whereby both the image data and the color data can be processed in the same manner.

Moreover, a group of the one-dimensionally aligned color data tables are allocated, as multiple color lookup tables, in a two-dimensional arrangement, thus allowing a greater amount of color data to be stored in a suitable memory.

In view of the above, a single texture image can use several CLUT data tables in the same memory and each CLUT table is or may be different from the other CLUT tables and uniquely adapted to meet the specific color ranges of the dedicated image area associated with it. Therefore, a plurality of CLUTs are provided, each CLUT being limited to a particular portion of the color spectrum. Each texture pattern or image area can be programmed to be associated with a different dedicated CLUT of lesser actual data resolution, but higher apparent color resolution because the more limited portion of the color spectrum handled by that CLUT. In this way, CLUT variations are provided for different textures calling for different color ranges, e.g., one for plants, one for cars, one for sky, and the like. Hence, a large family of CLUTs, each dedicated to a particular image subarea (larger than a single polygon) facilitates a greater number of available colors and increased efficiency in data processing.

Hence, the present invention satisfies a long existing need for enhanced image data processing offering a greater number of colors, compatible with relatively simple processing and for a recording medium carrying such enhanced image data.

These and other objects and advantages of the invention will become apparent from the following more detailed description, when taken in conjunction with the accompanying drawings of illustrative embodiments.

DESCRIPTION OF THE DRAWINGS

FIG. 19 is a block diagram illustrating the assignment of conventional pixel data; and FIG. 20 is a diagram illustrating conventional color lookup tables.

DETAILED DESCRIPTION OF THE PREFERRED EMBODIMENTS

Figure 1:
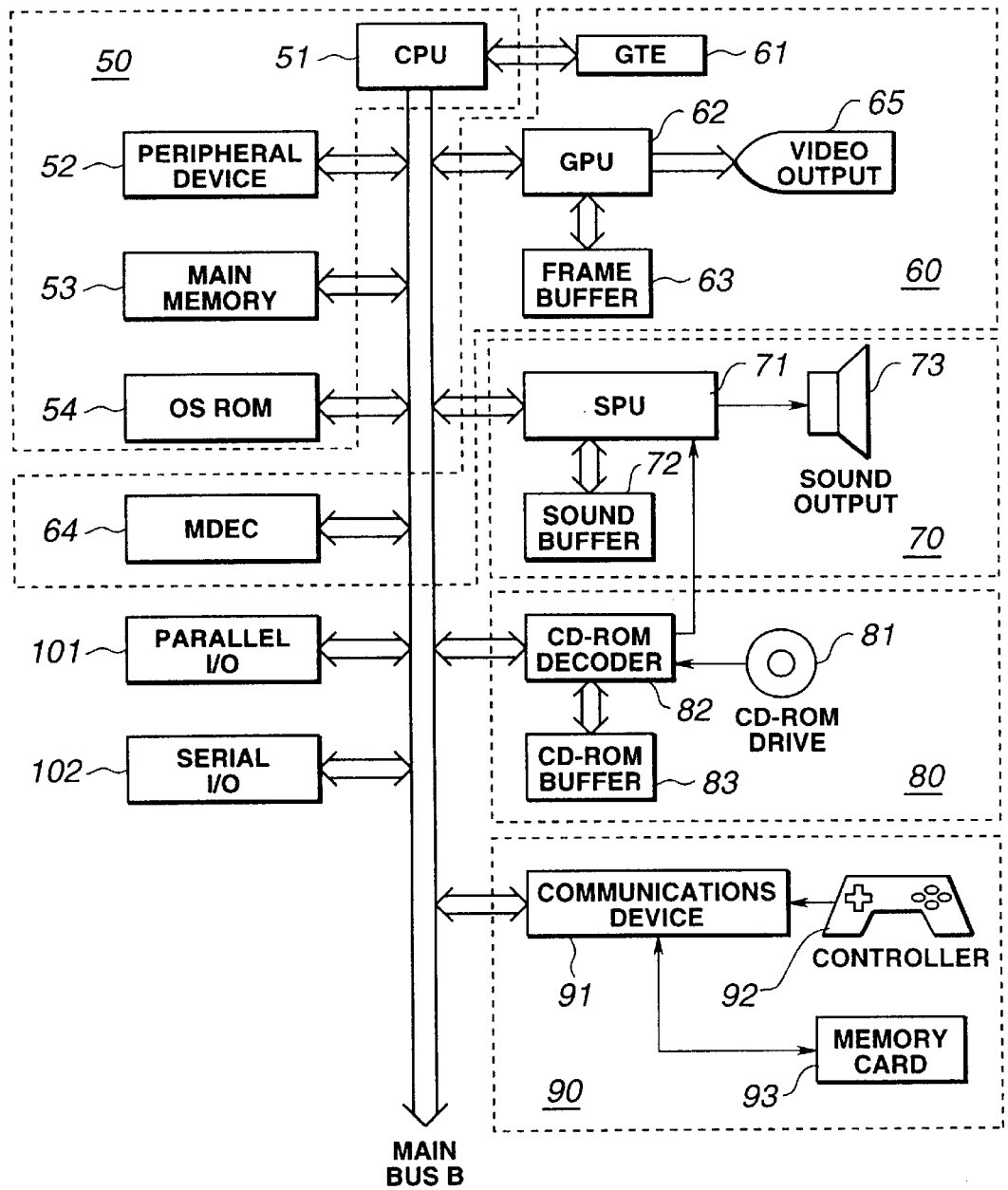
FIG. 1 is a block diagram of the overall system arrangement of an image data processing apparatus, in accordance with the present invention.

Referring now to the drawings, like reference numerals denote like or corresponding parts throughout the drawing figures.

Figure 17:
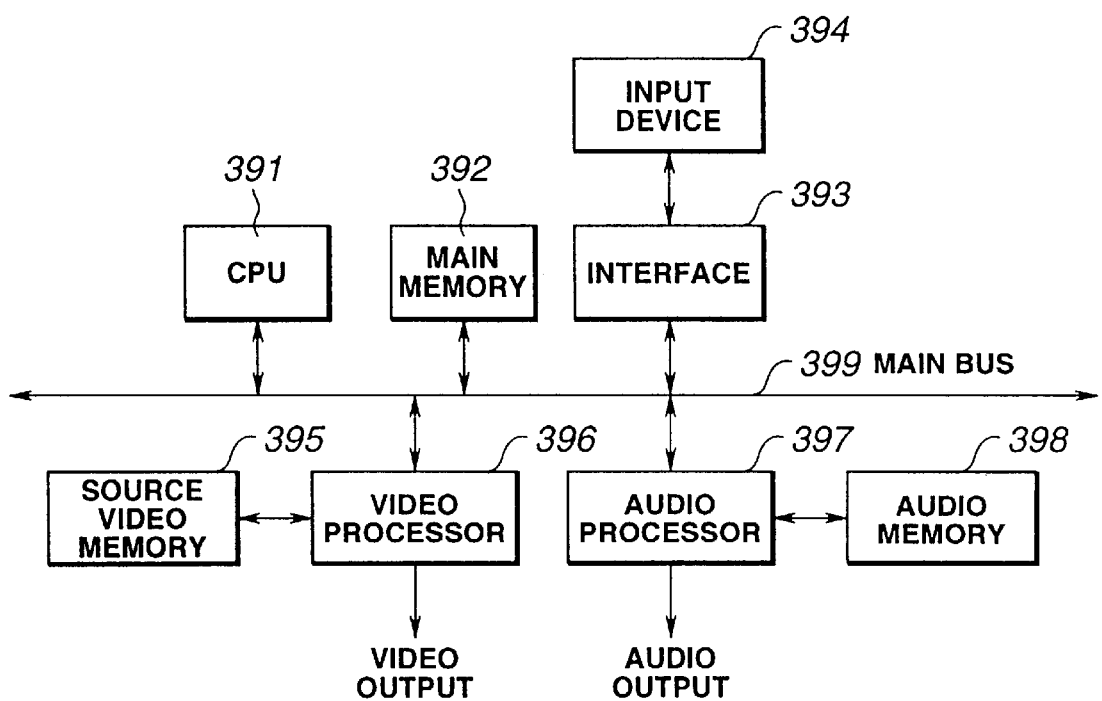
FIG. 17 is a system block diagram illustrating the arrangement of a prior art image producing apparatus (or home video-game machine)

A typical example of a prior art home video-game machine is illustrated in FIG. 17. As shown in FIG. 17, manipulation information introduced from an input device 394 such as an entry pad or a joy stick is passed across an interface 393 and introduced along a main bus 399 by the action of a CPU 391 consisting mainly of a microprocessor. As previously indicated, upon introduction of the manipulation data, a three-dimensional data stored in a main memory 392 is transmitted by the action of a video processor 396 to a source video memory 395 for temporal storage.

The CPU 391 also operates to transfer to the video processor 396 a specific sequence for reading out a series of image data segments from the source video memory 395 for overlapping them one over the other in the screen. According to the sequence of reading the image data segments, the video processor 396 reads the image data segments from the source video memory 395 and displays them in their overlap arrangement.

While the image data segments are being read and displayed, audio components of the manipulation information are fed to an audio processor 397 which, in turn, picks up corresponding audio data from an audio memory 398 for synchronization with the image data.

Figure 18:
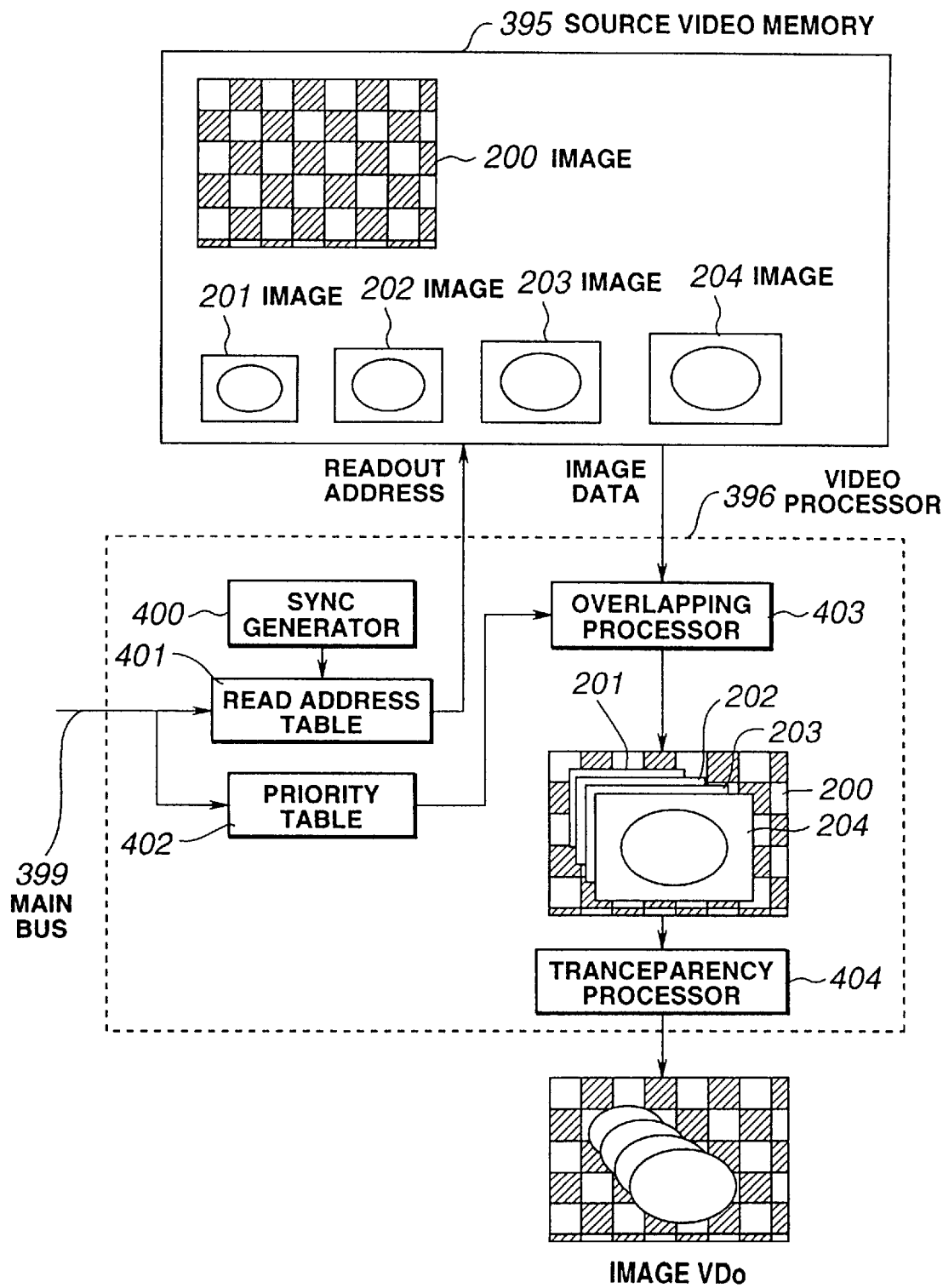
FIG. 18 is a combined block and schematic diagram illustrating an image producing method as carried out by the prior art image producing apparatus of FIG. 17.

As best observed in FIG. 18, there is shown a procedure of delivering a three-dimensional data on the basis of a two-dimensional data format in the home video-game machine illustrated in FIG. 17. FIG. 18 illustrates display of a cylindrical object on the background of a checker-board pattern in a three-dimensional image.

The source video memory 395 of FIG. 18 holds a background 200 of a checker-board pattern and a group of rectangle image segments or sprites 201, 202, 203, and 204 representing cross sections of the cylindrical object on the background 200. Other areas than the cross sections of the cylindrical object on the sprites 201, 202, 203, and 204 are drawn in transparency.

A sync generator 400 mounted in the video processor 396 is used to generate a read address signal in response to a sync signal of the image data. The read address signal of the sink generator 400 is transmitted via the main bus 399 to a read address table 401 determined by the CPU 391 as shown in FIG. 18. The sync generator 400 also reads the image segments from the source video memory 395 in response to a signal from the read address table 401.

The video data segments retrieved are then fed to an overlap processor 403 where they are overlapped, one over the other, in the sequence determined by a priority table 402 and passed via the main bus 399 from the CPU 391. As the background 200 comes first, and is then followed by the rectangle sprites 201, 202, 203, and 204 in that order, the group of sprites are placed, one over the other, on the background 200.

Then, the other areas in addition to the cross sections of the cylindrical object of the sprites 201, 202, 203, and 204 which are overlapped, one over the other, on the background are rendered to transparency by a transparency processor 404.

As a result, the two-dimensional image data of the cylindrical object can be reproduced as three-dimensional data VD0 of the original image as shown in FIG. 18.

The source video memory 395 is divided into two areas: a pixel data storage area, in which pixel data are aligned in a two-dimensional arrangement expressed by a matrix of small squares as shown in FIG. 19, and a color lookup table area, in which color data are aligned in a one-dimensional arrangement denoted by a row of small rectangles as shown in FIG. 20.

As best observed in FIG. 20, the color lookup table comprises a one-dimensionally aligned color data table extending in one direction or laterally of the source video memory 395. The color lookup table thus depends much on the lateral distance of the source video memory 395 and is limited in the number of colors to be displayed.

Prior to the description of a primary embodiment of the present invention in the form of a method for producing image data, an image processing system of another embodiment for generating a three-dimensional graphic data from the image data (a picture data, referred to as "TIM" data hereinafter) produced by the image data processing method of the present invention will be explained to enhance the subsequent understanding of the primary embodiment.

Referring now to the drawings, FIG. 1 shows an arrangement of the image processing system installed in a home video-game machine. The image processing system is substantially designed for use in a home video-game machine, a microcomputer, or a graphic computer apparatus device.

The image processing system of the embodiment of FIG. 1 allows an operator to play a game by controlling relevant data (e.g., game programs) of an image data format (referred to as TIM format), to be described subsequently in greater detail, retrieved from a recording medium such as an optical disk (e.g., a CD-ROM) which is also designed for storage of the data in a specific format.

More particularly, the image processing system comprises a geometry transfer engine (GTE) 61 and a graphic processing unit (GPU 62) which act in combination as a transforming means for converting three-dimensional image data retrieved from a CD-ROM disk into two-dimensional image data for drawing an image on a two-dimensional display screen, and a frame buffer 63 which serves as a memory means having an image data storage area (picture area or texture data area) for storage of the image data and at least a color data tables storage area (CLUT area) for storage of a group of color data tables, i.e., multiple color lookup tables, in a two-dimensional arrangement, each of the color data tables (a color lookup table is hereinafter referred to as a "CLUT") including a plurality of one-dimensionally aligned color data wherein the structure is arranged substantially identical to that of each data pixel in the image.

More specifically, the image processing system of the embodiment shown in FIG. 1 comprises a main controller module 50 composed of a central processing unit (CPU) 51 and its peripheral devices (including a peripheral device controller 52), a graphic module 60 composed substantially of a graphic processing unit (GPU) 62 for drawing an image on a frame buffer 63, a sound module 70 composed of a sound processing unit (SPU) 71 and other devices for emitting a music or effect sound, an optical disk controller module 80 for controlling an optical (CD-ROM) disk drive 81 which acts as an auxiliary memory means and decoding of reproduced data, a communications controller module 90 for controlling entry of command signals from a controller 92, input and output of information on game parameter setting on a sub memory (or a memory card) 93, and a main bus B connected from the main control module 50 to the communications controller module 90.

The main controller module 50 comprises the CPU 51, the peripheral device controller 52 for controlling interrupt actions, time sequences, memory actions, and transmission of a direct memory access (DMA) signal, a main memory 53 composed of, e.g., 2-megabytes of RAM, and a ROM 54 of, for example, 512 kilobytes, in which programs, including an operating system for operating the main memory 53, graphic module 60, and sound module 70, are stored.

The CPU 51 may be a 32-bit reduced instruction set computer (RISC) for performing the operating system stored in the ROM 54 to control the entire system. The CPU 51 also includes a command cache and a scratch pad memory for controlling real storage.

The graphic module 60 comprises a GTE 61 consisting of a coprocessor for coordinate calculation to perform a coordinate transform process, the GPU 62 for drawing an image in response to command signals from the CPU 51, the frame buffer 63 has, e.g., one megabyte for storage of graphic data provided by the GPU 62, and an image decoder 64 (referred to as "MDEC" hereinafter) for decoding a coded image data compressed and encoded by an orthogonal transform process such as discrete cosine transforming.

The GTE 61 may have a parallel processor for performing a plurality of arithmetic operations in parallel and acts as a coprocessor for the CPU 51 to operate high-speed actions for coordinate transforming and calculation of light source, vector, and matrix of fixed decimal point notation.

More specifically, the GTE 61 is capable of performing the coordinate calculation of polygons at typically 1.5 million per second for flat shading where each triangle polygon is drawn in one single color. This allows the image processing system to minimize the load to the CPU 51 and thus perform the coordinate calculations at a higher speed.

The GPU 62 is responsive to a polygon drawing command from the CPU 51 for drawing a polygon or graphic to the frame buffer 63. The GPU 62 can draw up to 360,000 polygons per second and also, has a two-dimensional address space independently of the CPU 51 for mapping of the frame buffer 63.

The frame buffer 63 comprises a so-called dual port RAM which performs at the same time a retrieving of drawing data from the GPU 62 or a transfer of data from the main memory 53 and a releasing of data for display.

Also, the frame buffer 63 may have a size of one megabyte constituting a pixel matrix of 1024 in horizontal by 512 in vertical in 16-bit format. Any desired area in the size of the frame buffer 63 can be delivered to a video output means 65 such as a display.

In addition to the area delivered as a video output, the frame buffer 63 includes a color lookup table (referred to as "CLUT" hereinafter) area for storage of a CLUT which is used as a reference during drawing of graphics or polygons with the action of the GPU 62 and a texture area for storage of texture data to be coordinate transformed and mapped on the graphics or polygons drawn by the GPU 62. Both the CLUT and texture areas can be varied dynamically depending on a change of the display area. The frame buffer 63 can thus execute a drawing access to the area on display and a high-speed DMA transfer to and from the main memory 53.

The GPU 62 can also perform, in addition to the flat shading, Gouraud shading in which the color of a polygon is determined by interpolation of vertex color, and texture mapping in which a texture selected from the texture area is attached to a polygon.

For the Gouraud shading or texture mapping, the GTE 61 can perform the coordinate calculation at a rate of up to 500,000 polygons per second.

The MDEC 64 is responsive to a command signal from the CPU 51 for decoding a still or motion image data retrieved from a CD-ROM disk and stored in the main memory 53 and subsequently storing it again in the main memory 53. More particularly, the MDEC 64 performs a reverse discrete cosine transforming operation (referred to as reverse DCT) at a high speed for expanding compressed data of the color still image compression standard (known as JPEG) or the motion image encoding standard for storage media (known as MPEG, but for intraframe compression in this embodiment).

The image data reproduced is transferred via the GPU 62 to the frame buffer 63 and can therefore be used as a background for an image drawn by the GPU 62.

The sound module 70 comprises the sound processor unit (SPU) 71 responsive to a command from the CPU 51 for generating a music or effect sound, a sound buffer 72 having, by way of example and not necessarily by way of limitation, 512 kilobytes for storage of audio data of voice or music sound, sound source data retrieved from a CD-ROM, and a loud speaker 73 acting as a sound output means for emitting a music or effect sound generated with the SPU 71.

The SPU 71 has an adaptive differential pulse code modulation (ADPCM) signal decoding function for reproducing an audio data of 4-bit ADPCM format converted from a 16-bit audio data, a playback function for reproducing the sound source data stored in the sound buffer 72 to emit a music or effect sound, and a modulating function for modulating the audio data stored in the sound buffer 72 for playback. More specifically, the SPU 71 has an ADPCM sound source with 24-voices in which motion parameters of looping and time coefficients are automatically modified and which is actuated by a signal from the CPU 51. The SPU 71 controls its address space mapped with the sound buffer 72 and can perform the reproduction of audio data by direct transmission of ADPCM data with information of key-on/key-off or modulation from the CPU 51 to the sound buffer 72.

Accordingly, the sound module 70 is used as a sampling sound source for generating a music or effect sound corresponding to the audio data stored in the sound buffer 72 upon receiving a command signal from the CPU 51.

The optical disk controller module 80 comprises the disk drive 81 for retrieving a program or data from an optical disk of CD-ROM, a decoder 82 for decoding an encoded, stored program or data accompanied with error correction codes (ECC), and a buffer 83 of, for example, 32 kilobytes for storage of data retrieved from an optical disk. The optical disk controller module 80 composed of the disk drive 81, decoder 82, and other components for reading data from a disk is also arranged to support other disk formats including CD-DA and CD-ROM XA. The decoder 82 also serves as a member of the sound module 70.

The audio data retrieved by the disk drive 81 from the disk is not limited to the ADPCM format (for storage on CD-ROM XA disks) but may be of a common PCM mode produced by analog-to-digital conversion.

The ADPCM data may be recorded in 4-bit differential form calculated from 16-bit digital data and is first subjected to error correction and decoding in the decoder 82, transmitted to the SPU 71 where it is D/A converted, and supplied to the loud speaker 73 for playback.

The PCM data may be recorded in 16-bit digital signal form and is decoded by the decoder 82 for driving the loud speaker 73. An audio output of the decoder 82 is first sent to the SPU 71 where it is mixed with an SPU output and released through a reverberation unit for audio playback.

The communications controller module 90 comprises a communications controller device 91 for controlling communications along the main bus B with the CPU 51, the controller 92 for entry of commands by an operator, and the memory card 93 for storage of game setting data.

The controller 92 is an interface for transmitting instructions of the operator to application software and may carry 16 command keys for entry of the instructions. Commands attributed to the keys as predetermined by the communications controller device 91 are fed to the communications controller device 91 in synchronous mode at a speed of 60 times per second. The communications controller device 91 then transmits the key commands to the CPU 51. The controller 92 has two connectors arranged thereon for connection of a number of the controllers one after another through multi-tap ports.

Accordingly, upon receiving the command from the operator, the CPU 51 starts performing a corresponding process action determined by a game program.

When the initial setting on a game to be played is requested, the CPU 51 transfers relevant data to the communications controller device 91 which, in turn, stores the data in the memory card 93.

The memory card 93 is separated from the main bus B and can freely be installed or removed while the main bus B is being energized. This will allow data of the game setting to be stored in two or more of the memory cards 93.

The system of this embodiment of the present invention is also provided with a 16-bit parallel input and output (I/O) port 101 and an asynchronous serial input and output (I/O) port 102. The system can be connected at the parallel I/O port 101 to any other peripheral device and at the serial I/O port 102 to another video game machine for communications.

Between the main memory 53, the GPU 62, the MDEC 64, and the decoder 82, it is required to transfer at a high speed huge amounts of the image data for reading a program, displaying a text, or drawing a graphic. The image processing system of this embodiment is thus adapted for allowing direct data transfer or DMA transfer between the main memory 53, the GPU 62, the MDEC 64, and the decoder 82 without using the CPU 51. Rather, it is under the control of the peripheral device controller 52. As a result, the load to the CPU 51 during the data transfer will be considerably reduced, thus ensuring high-speed data transfer operations.

The video game machine of the present invention allows the CPU 51 to execute the operating system stored in the RAM 54 upon being energized. As the operating system is executed, the actions of the graphic module 60 and the sound module 70 are correctly controlled by the CPU 51.

In addition, upon the operating system being invoked, the CPU 51 starts initializing the entire system by reviewing each action and then by actuating the optical disk controller module 80 for performing a desired game program stored on an optical disk.

During execution of the game program, the CPU 51 actuates the graphic module 60 and the sound module 70 in response to command inputs by the operator for controlling display of images and reproduction of music or effect sounds. The representation of image data on the display by the image data processing apparatus of the present invention is next explained.

Figure 2:
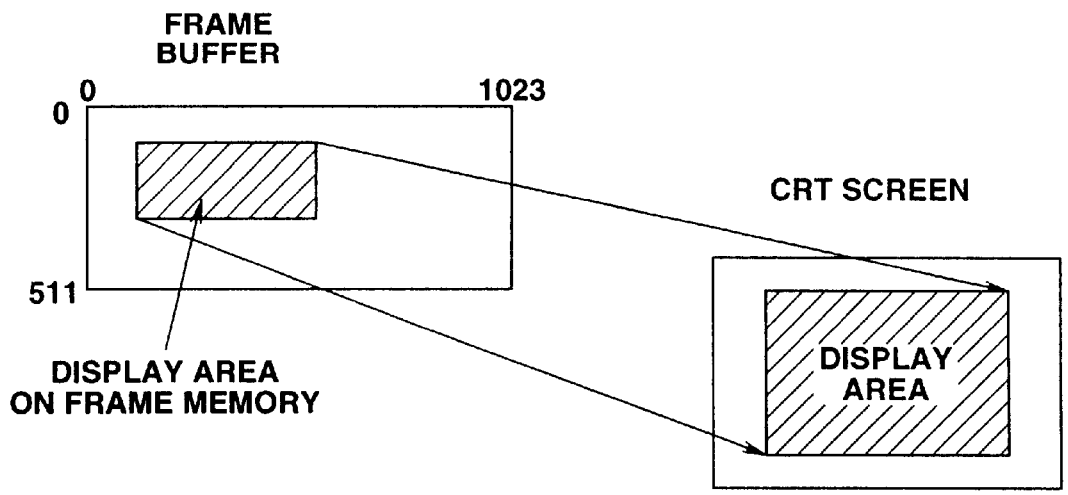
FIG. 2 is a diagram illustrating representation on a display.

The GPU 62 displays the area of a desired graphic model produced by the frame buffer 63 on the video output means 65 or display, e.g., such as a CRT. The area is referred to hereinafter as a display area. The relationship between the display area and the display screen is illustrated in FIG. 2.

The GPU 62 is designed to support ten different display modes which are shown below.

| Mode | Resolution | Remarks |
| --- | --- | --- |
| 0 | 256(H) × 240(V) | Non-interlaced |
| 1 | 320(H) × 240(V) | Non-interlaced |
| 2 | 512(H) × 240(V) | Non-interlaced |
| 3 | 640(H) × 240(V) | Non-interlaced |
| 4 | 256(H) × 480(V) | Interlaced |
| 5 | 320(H) × 480(V) | Interlaced |
| 6 | 512(H) × 480(V) | Interlaced |
| 7 | 640(H) × 480(V) | Interlaced |
| 8 | 384(H) × 240(V) | Non-interlaced |
| 9 | 384(H) × 480(V) | Interlaced |

Figure 3:
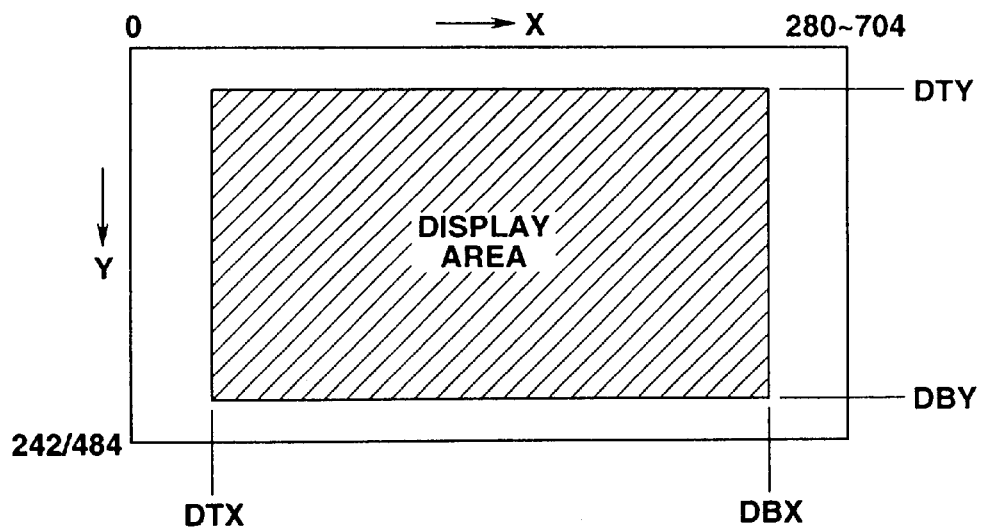
FIG. 3 is a diagram showing setting of representation on a display.

The size or the number of pixels of the display screen is variable and both the locations of display starting and end (expressed by (DTX,DTY) and (DBX,DBY) respectively on a coordinate plane) can separately be determined in the horizontal direction and the vertical direction respectively, as shown in FIG. 3.

The relation between a range of applicable values in the coordinate and the display mode is shown below. It is noted that DTX and DBX are multiples of 4. Hence, the minimum screen size consists of 4 pixels in horizontal by 2 pixels in vertical (in a noninterlaced mode) or 4 pixels (in an interlaced mode).

*The range of applicable values along the X axis:

| Mode | DTX | DBX |
| --- | --- | --- |
| 0 and 4 | 0 to 276 | 4 to 280 |
| 1 and 5 | 0 to 348 | 4 to 352 |
| 2 and 6 | 0 to 556 | 4 to 560 |
| 3 and 7 | 0 to 700 | 4 to 704 |
| 8 and 9 | 0 to 396 | 4 to 400 |

*The range of applicable values along the Y axis:

| Mode | DTY | DBY |
| --- | --- | --- |
| 0 to 3 and 8 | 0 to 241 | 4 to 243 |
| 4 to 7 and 9 | 0 to 480 | 4 to 484 |

Furthermore, the GPU 62 supports two display color modes, 16-bit direct mode (32768 colors) and 24-bit direct mode (full color). The 16-bit direct mode (referred to hereinafter as a 16-bit mode) offers 32768 colors. Although it is limited to the number of displayable colors as compared with the 24-bit direct mode (referred to hereinafter as a 24-bit mode), the 16-bit mode allows color calculations of the GPU 62 to be carried out in 24-bit mode, and also has a dithering function which simulates a quasi-full-color (24-bit color) display. The 24-bit mode offers 16,777,216 colors (full color) and provides a bit-mapped display of image data transferred to the frame buffer 63, but fails to actuate any drawing action by the GPU 62. While the bit length of a pixel comprises 24 bits, the coordinate and location values on the frame buffer 63 have to be determined on the basis of 16-bit format. For example, 24-bit image data of 640×480 is treated as 960×480 in the frame buffer 63. Also, DBX is expressed by a multiple of 8. Accordingly, the minimum display size in the 24-bit mode is 8 pixels in horizontal by 2 pixels in vertical.

The drawing functions of the GPU 62 are next described. The drawing functions include:

sprite drawing for generating sprites (e.g., a polygon) ranging from 1×1 dots to 256×256 dots in a 4-bit CLUT mode (4-bit format with 16 colors per sprite), 8-bit CLUT mode (8-bit format with 256 colors per sprite), and 16-bit CLUT mode (16-bit format with 32768 colors per sprite);

polygon drawing for executing drawing of a polygon (triangle, quadrilateral, and the like) of which each vertex is defined by coordinate values and then, performing flat shading for filling the polygon with a single color, Gouraud shading for providing a graduation on the polygon by assigning a different color to each vertex, and texture mapping for applying (a texture pattern of) two-dimensional image data onto the surface of the polygon;

line drawing in which gradation is applicable; and image data transfer for transferring image data from the CPU 51 to the frame buffer 63, from the frame buffer 63 to the CPU 51, and from the frame buffer 63 to the same.

Another function may be added, such as semitransparent rendering, wherein pixels are averaged (also known as alpha blending because data of pixels are combined together at a desired or alpha ratio), dithering for smoothing the interface of colors with the use of noise, clipping for eliminating features outside of the drawing area, or offsetting, in which the origin of the drawing is shifted depending on the drawing area.

Figure 4:
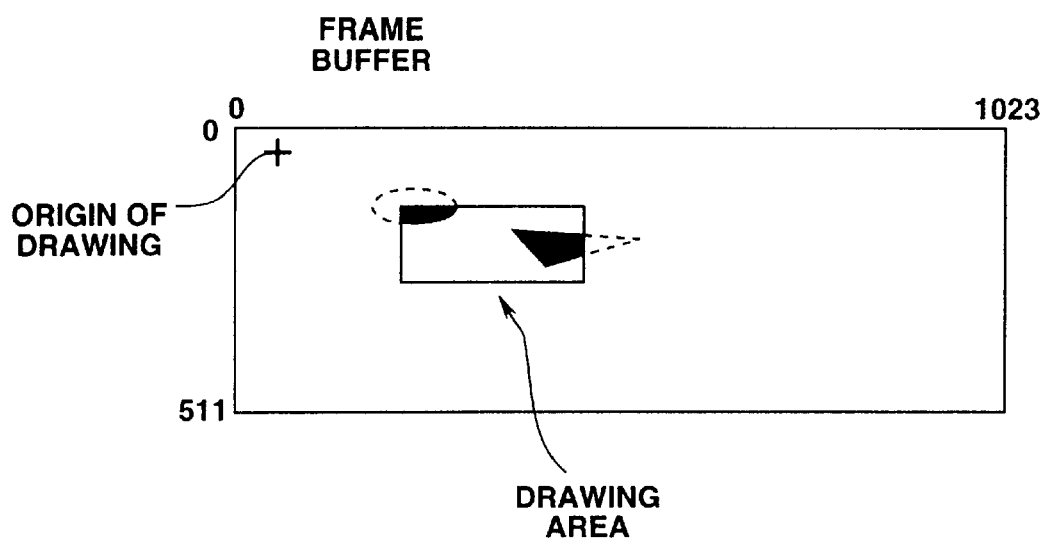
FIG. 4 is a diagram illustrating the clipping function for drawing.

The coordinate system on which a graphic is drawn is based on an 11-bit format, thus assigning each value of X and Y to a range of −1024 to +1023. As shown in FIG. 4, the size of the frame buffer 63 is 1024×512 and any extension may be folded. The origin of a drawing can arbitrarily be determined within the frame buffer 63 by controlling offset values of the coordinates. Because of the clipping function, the drawing is applicable to any shape only within the frame buffer 63.

As the sprite supported by the GPU 62 represents 256× 256 dots at the maximum, its horizontal and vertical lengths can freely be determined within that range.

Figure 5:
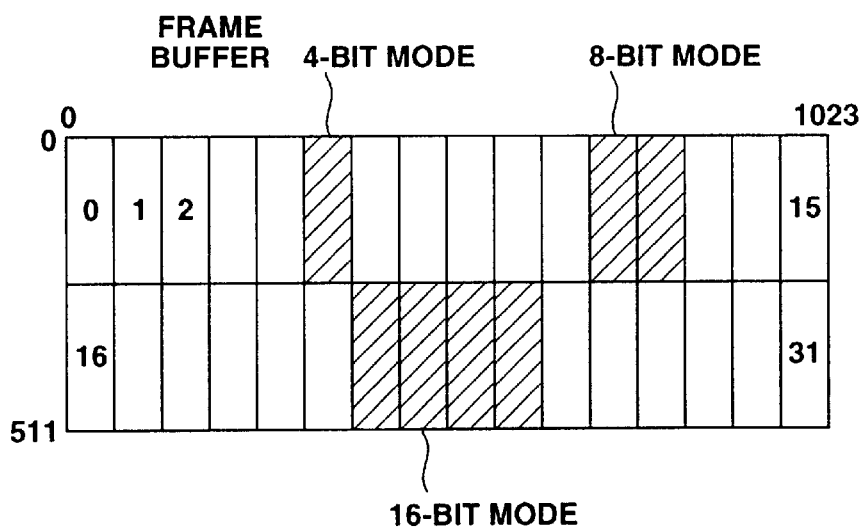
FIG. 5 is a diagram illustrating a texture page.

Image data (of a sprite pattern) to be attached to the sprite is allocated to a non-display area of the frame buffer 63 as shown in FIG. 5. Hence, the sprite pattern is transmitted to the frame buffer 63 before starting the command of drawing. A number of the sprite patterns may be preserved in the form of page units of 256×256 pixels so long as memory areas of the frame buffer 63 are available. The 256×256 pixel size is called a texture page. The location of each texture page is determined by assigning a page number to the parameter of a drawing command termed TSB for specifying the (address) point of texture page.

The sprite pattern is classified into three types of the color mode, 4-bit CLUT mode, 8-bit CLUT mode, and 16-bit CLUT mode. The 4-bit and 8-bit CLUT modes employ a CLUT.

Figure 6:
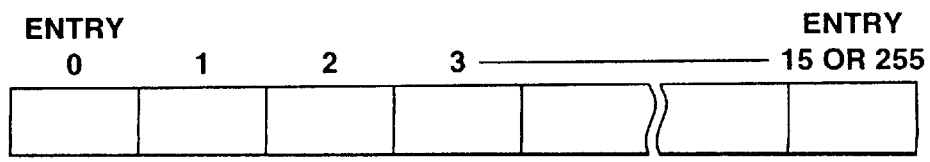
FIG. 6 is a diagram showing the structure of a CLUT.

The CLUT is shown in FIG. 6 where 16 to 256 of R, G, and B values of the three primary colors for creating visible colors to be displayed are aligned on the frame buffer 63. The R, G, and B values are numbered up in a sequence from the left end of the frame buffer 63 and the color of a pixel in the sprite pattern is identified by the number. The CLUT can be selected for every sprite and the sprites may be associated with their respective CLUTs. In FIG. 6, each entry represents a single pixel of the 16-bit mode and each CLUT is equal to 1×16 bits (in the 4-bit mode) or 1×255 bits (in the 8-bit mode) of the image data. The location of storage of the CLUT in the frame buffer 63 is determined by assigning coordinate values at the left end of the CLUT to be used to the parameter of a drawing command termed CBA for specifying the (address) point of CLUT.

A single texture image can use several CLUT data tables in the same memory and each CLUT table is, or may be different from, the other CLUT tables and is uniquely adapted to meet the specific color ranges of the dedicated image area associated with it. Therefore, a plurality of CLUTs are provided, each CLUT being limited to a particular portion of the color spectrum. Each texture pattern or image area can be programmed to be associated with a different dedicated CLUT of lesser actual data resolution, but higher apparent color resolution because the more limited portion of the color spectrum handled by that CLUT. In this way, CLUT variations are provided for different textures calling for different color ranges, e.g., one for plants, one for cars, one for sky, and the like. Hence, a large family of CLUTs, each dedicated to a particular image subarea (larger than a single polygon) facilitates a greater number of available colors and increased efficiency in data processing.

Figure 7:
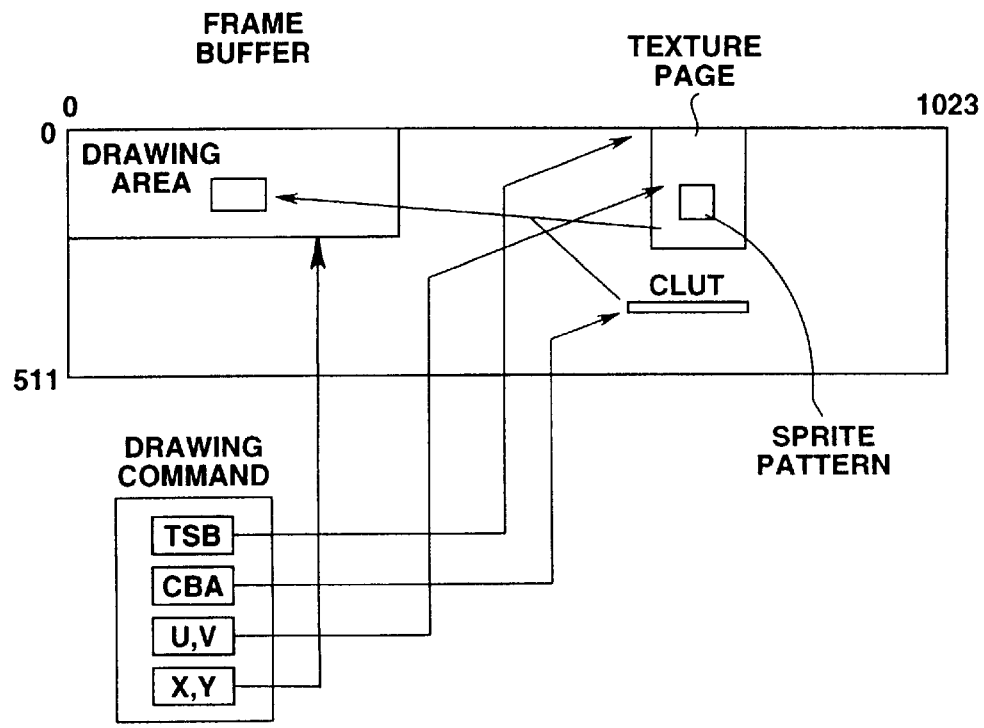
FIG. 7 is a diagram illustrating the fundamentals of drawing a sprite.

The drawing of a sprite is schematically shown in FIG. 7, in which U and V of the drawing commands are parameters for specifying the location in a texture page as expressed in a horizontal direction and a vertical direction respectively. Also, X and Y are parameters for specifying the location of a drawing area.

Figure 8:
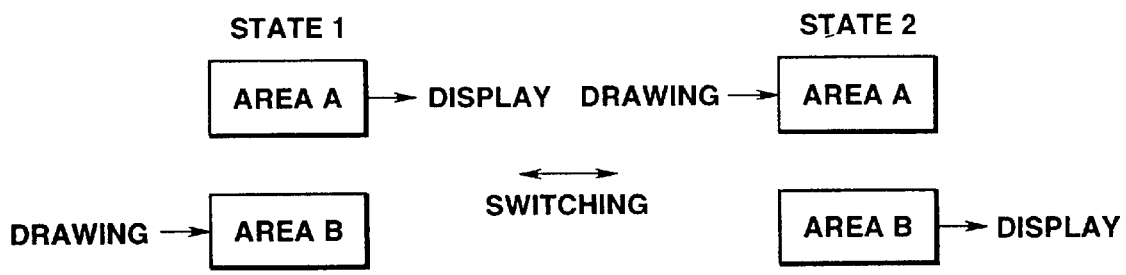
FIG. 8 is a diagram illustrating frame double buffering.

The GPU 62 employs a motion display technique known as frame double buffering in which, as shown in FIG. 8, two quadrilateral patterns are prepared on the frame buffer 63; one is displayed while a graphic is being mapped in the other. When the drawing has been completed, the two patterns are switched over. This allows the display of rewriting action to be avoided. The switching over on the frame buffer 63 may be carried out during the vertical interval. Also, as the shape and origin of coordinates of a graphic to be drawn are arbitrarily determined in the GPU 62, they can be utilized with movements for appointing a plurality of the buffers.

The (TIM) format of the image data handled with the image data processing system of the present invention is next described.

The TIM format is a standard format processed in the image data processing system of the present invention and carries TIM format data (hereinafter referred to as TIM data). The TIM data can be transferred directly to the frame buffer 63 of the image data processing system and is utilized as data for a sprite pattern or three-dimensional texture mapping.

The image data compatible with the image data processing system are classified into four modes (image data modes): 4-bit CLUT mode (16 colors), 8-bit CLUT mode (256 colors), 16-bit direct color mode (32768 colors), and 24-bit direct color mode (full colors). The frame buffer 63 in the embodiment is based on a 16-bit format and can handle only the 16-bit mode and the 24-bit mode. However, if the image data is used as texture mapping data of polygons or sprite patterns, desired data can be selected from the 4-bit, 8-bit, and 16-bit modes, respectively.

Figure 9:
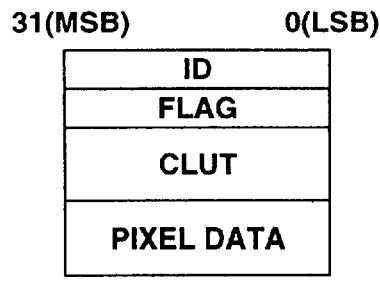
FIG. 9 is a diagram showing a format of TIM file.
Figure 10:
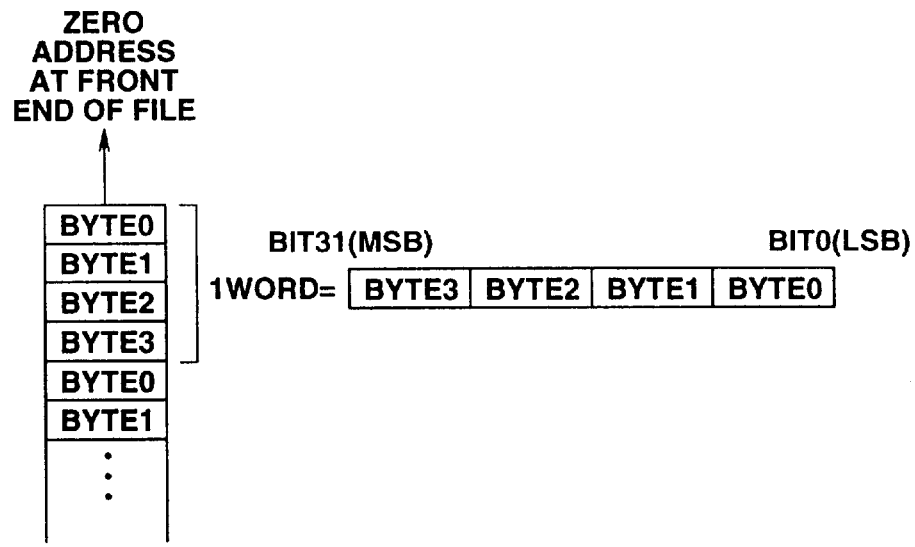
FIG. 10 is a diagram illustrating an order of bytes in the file.

As shown in FIG. 9, the TIM file comprises a file header (ID) in the front end and a plurality of blocks. The data is composed of a train of 32-bit binary data which, in Little Endian form, and are aligned by byte number-least byte first (as numbered in ascending order), as shown in FIG. 10.

The TIM file is next described in greater detail.

Figure 11:
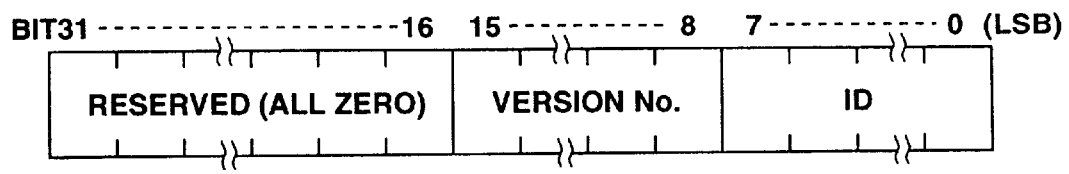
FIG. 11 is a diagram showing the structure of an ID of the TIM file format.

The ID or header of FIG. 9 is a file ID comprising one word of its bit assignment as shown in FIG. 11. In FIG. 11, the ID includes bits 0 to 7 representing 0x10 in the embodiment. Bits 8 to 15 indicate a version number of 0x00.

Figure 12:
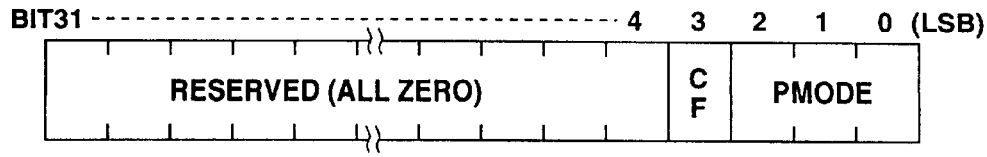
FIG. 12 is a diagram showing the structure of a FLAG of the TIM file format.

The FLAG of FIG. 9 is 32-bit data representing information on data structure and its bit assignment is shown in FIG. 12. When the TIM file is composed of a set of sprites and texture patterns, it contains different modes, and the PMODE in FIG. 12 represents four of these modes, including a mixed mode. More particularly, bits 0 to 3 of the PMODE shown in FIG. 12 express a pixel mode (bit length); bit 0 represents the 4-bit CLUT mode, bit 1 is the 8-bit CLUT mode, bit 2 is the 16-bit direct mode, bit 3 is the 24-bit direct model, and bit 4 is the mixed mode. Bit 4 (CF) in FIG. 12 indicates the presence of a CLUT; a 0 at bit 4 indicates no CLUT presence and a 1 indicates the presence of a CLUT. The other bits are 0s reserved for other specific use.

Figure 13:
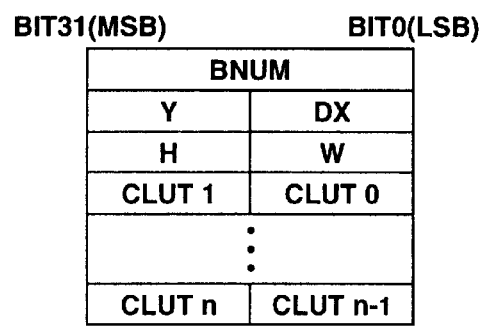
FIG. 13 is a diagram showing the structure of a CLUT of the TIM file format.

The CLUT of FIG. 9 starts with "bnum" indicating a number of bytes as shown in FIG. 13. "bnum" is followed by data of locations in the frame buffer 63, image size data, and main data. The CLUT represents a color pallet applicable to image data of the 4-bit or 8-bit color mode. The CLUT in the TIM file is determined by a CF flag of FLAG in the (ID) header. As previously indicated, if the CF flag is 1, the TIM file holds the CLUT. "bnum" of FIG. 13 represents a data length in bytes of CLUT (including 4 bytes of "bnum"). In addition, DX is an x coordinate and DY is a y coordinate in the frame buffer 63. H indicates a length of the data in the lengthwise direction and W is in the crosswise direction. CLUT 0 to CLUT n represent CLUT entries (16 bits/entry).

In the 4-bit mode, 16 CLUT entries constitute a set of CLUT data. In the 8-bit mode, 256 entries make up one CLUT. In this embodiment of the invention, CLUTs are disposed in the frame buffer 63 and treated as rectangular frame buffer image forms in the TIM file. More specifically, one CLUT entry is equivalent to one pixel in the frame buffer 63. Accordingly, one set of CLUT data comprises a rectangular matrix of 1 high×16 wide in the 4-bit mode and of 1 high by 256 wide in the 8-bit mode.

Figure 14:
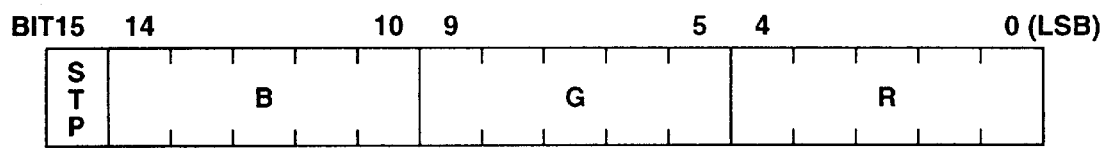
FIG. 14 is a diagram showing the structure of a CLUT entry.

The TIM file may contain a plurality of CLUTs as is designated in this embodiment of the invention. A group of CLUTs are allocated as a segment of image data in each CLUT block of the TIM file. FIG. 14 shows a structure of the CLUT entry representing one color. STP in FIG. 14 is a transparency controlling bit. Also, R is a red color component (5 bits), G is a green color component (5 bits), and B is a blue color component (5 bits).

The transparency controlling bit (STP) is available when sprite or texture data is involved. The STP bit is used to determine the transparency of a pixel in a sprite or polygon to be drawn. When STP is 1, the pixel is semitransparent and when it is not 1, the pixel is opaque or transparent. In R, G, and B, colors turn transparent when bits are 0s. Otherwise, the colors are fully developed (not transparent). These relations are apparent from:

| STP/R,G,B | Semitransparency process on | off |
|---|---|---|
| 0,0,0,0 | Transparent | Transparent |
| 0,X,X,X | Not transparent | Not transparent |
| 1,X,X,X | Semitransparent | Not transparent |

The "Pixel" shown in FIG. 9 contains main image data which are 16-bit sets because the frame buffer 63 in this embodiment operates with a 16-bit format.

Figure 15:
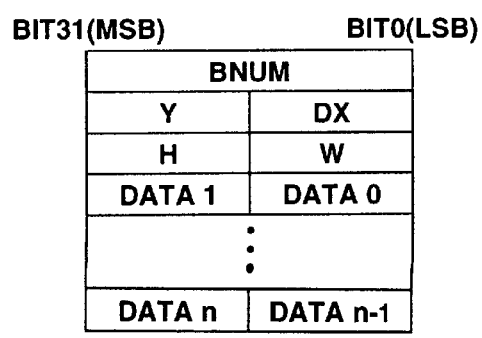
FIG. 15 is a diagram showing the structure of "Pixel" data of the TIM file format.

FIG. 15 also illustrates a structure of a "Pixel". "bnum" in FIG. 15 represents a data length of "Pixel" expressed in bytes. In this embodiment, "bnum" contains four bytes. Furthermore, DX is an x coordinate and DY is a y coordinate in the frame buffer 63. H indicates a length of the data in the lengthwise direction and W is in the crosswise direction. DATA 1 to DATA n are (16-bit) buffer frame data. Each (16-bit) buffer frame data is varied depending on the mode of the image data.

Figure 16A:
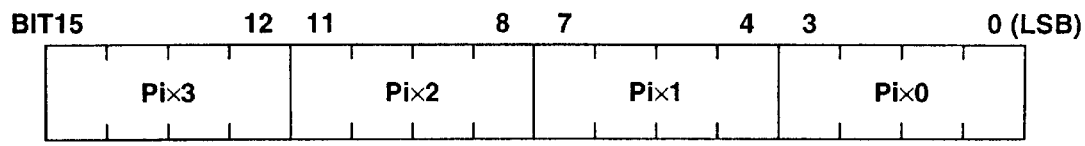
FIGS. 16A–16D are diagrams showing structures of different modes of image data.
Figure 16B:
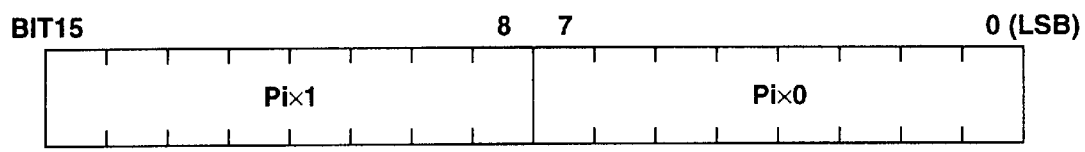
Figure 16C:
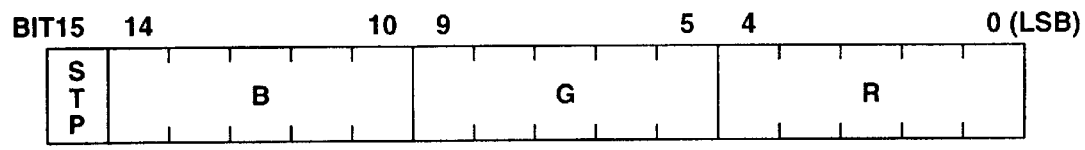
Figure 16D:
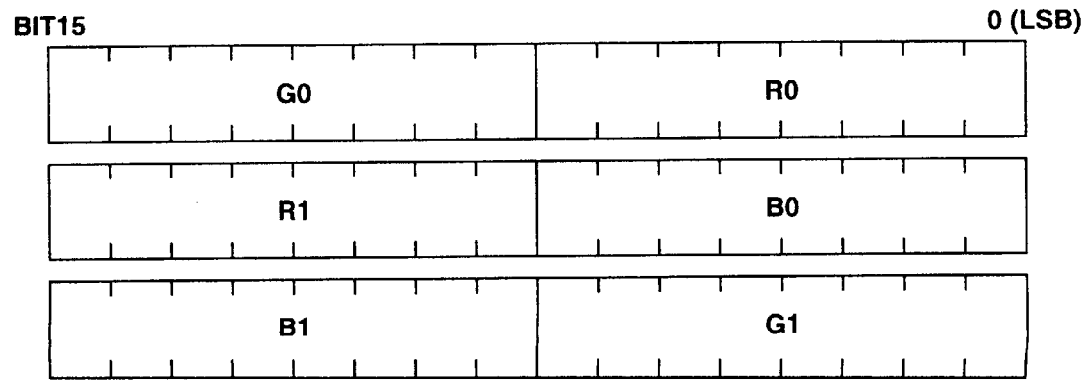

The bit assignment of each mode is shown in FIGS. 16A–16D. FIG. 16A shows the 4-bit mode in which "Pix 0" to "Pix 3" are pixel values (CLUT number). On a display, "Pix 0" comes first and is followed by "Pix" 1, 2, and 3. FIG. 16B illustrates the 8-bit mode in which "Pix 0" and "Pix 1" are pixel values (CLUT number) and "Pix 1" follows "Pix 0" on a display. FIG. 16C shows the 16-bit mode where STP is the transparency controlling bit (similar to that in CLUT). Also, R is a red color component (5 bits), G is a green color component (5 bits), and B is a blue color component (5 bits). FIG. 16D is the 24-bit mode in which Rn is a red color component (8 bits), Gn is a green color component (8 bits), and Bn is a blue color component (8 bits). In the 24-bit mode, three 16-bit data are equal to 2 pixels of data. As shown in FIG. 16D, (R0, G0, B0) represents a pixel at the left and (R1, G1, B1) represents a pixel at the right.

Care should be taken to determine the size of pixel data in the TIM file. As W (a value in crosswise direction) is denoted in 16-bit pixels, it is ¼ and ½ of the real size in the 4-bit and 8-bit modes respectively. For compensation, the crosswise length of the image size should be a multiple of 4 in the 4-bit mode and an even number in the 8-bit mode.

As set forth above, the structure of each color data in the one-dimensionally aligned color data table which includes a plurality of color data is arranged substantially identical to the structure of each pixel data in an image so that both image data and color data can be processed in the same manner. It is thus possible to simplify the operation of corresponding data processes. As a group of the one-dimensionally aligned color data tables, i.e., multiple CLUT's, are allocated in a two-dimensional arrangement according to the present invention, the color data to be stored in a suitable memory are increased in number thus contributing to enhanced representation in a number of colors.

Hence, the present invention satisfies a long existing need for enhanced image data processing offering a greater number of colors, compatible with relatively simple processing and for a recording medium carrying such enhanced image data.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. An image processing apparatus, comprising:

a first memory area for storing a plurality of pixel data representing a two-dimensional image having a plurality of image areas, said plurality of pixel data arranged in a two-dimensional matrix arrangement;

a second memory area for storing color data aligned in a one-dimensional arrangement in a plurality of color information tables in a format corresponding to said two-dimensional pixel-data matrix arrangement, at least one of said color information tables corresponding to each of said image areas in said first memory area.

2. An image processing apparatus as recited in claim 1, and further comprising:

a third memory area for displaying said image areas in a display area; and drawing means for drawing said image areas on said third memory area.

3. An image processing apparatus as recited in either claims 1 or 2, wherein said first memory area includes a texture image.

4. An image data processing method for producing three-dimensional image data which is converted into two-dimensional image data for drawing an image on a two-dimensional display screen, said image comprising a plurality of image areas each having a color requirement associated with a particular part of the color spectrum, the method comprising the steps of:

providing a plurality of color lookup tables arranged in a two-dimensional matrix, each color lookup table containing color data, each color lookup table assignable to any one of said plurality of image areas; and forming the structure of the color data in each of said color lookup tables to include a selected variety of color data arranged to identically correspond to the arrangement of each pixel of data in the image area, said color data tailored to meet the color requirement of said pixel.

5. An image data processing apparatus, comprising:

a data processor for converting three-dimensional image data into two-dimensional image data for drawing an image on a two-dimensional display, said image comprising a plurality of image areas each having a color requirement associated with a particular part of the color spectrum; and a memory having an image data storage area for storage of said image data and at least a color data storage area for storage of a plurality of color lookup tables in a two-dimensional arrangement, each of said color lookup tables including a selected variety of color data arranged to identically correspond to the arrangement of each pixel of data in said image area, said color data tailored to meet the color requirement of said pixel.

6. A recording medium carrying three-dimensional image data for conversion into two-dimensional image data for drawing an image on a two-dimensional display, said image comprising a plurality of image areas each having a color requirement associated with a particular part of the color spectrum, said recording medium comprising:

a plurality of color lookup tables stored on said recording medium in a two-dimensional matrix format, each of said color lookup tables including a selected variety of color data arranged to identically correspond to the arrangement of each pixel of data in the image area, said color data tailored to meet the color requirement of said pixel.

7. A method for processing an image, comprising the steps of:

(a) storing a plurality of pixel data in a first memory area in a two-dimensional matrix format, said pixel data representing an image having a plurality of image areas; and (b) designating an area in a second memory area having color information stored in a format corresponding to said two-dimensional pixel-data matrix format, said color information corresponding to the color needs of each of said image areas in said first memory area.

8. A method as set forth in claim 7, and further comprising the step of:

drawing said image areas to a third memory area for displaying said image areas in a display area.

9. An image data processing system for processing an image having a plurality of image areas, comprising:

a plurality of image data tables for defining at least one of said image areas, each image data table including a plurality of one-dimensionally aligned pixel data stored in a two-dimensional matrix format;

a plurality of color data tables, each capable of containing color data different from the data in other color data tables, said color data stored in a format which corresponds to the format of said image data tables; and means for associating each of said image areas with a selected one of said color data tables.

* * * * *